United States Patent [19]

Halle et al.

[11] Patent Number: 5,500,260
[45] Date of Patent: Mar. 19, 1996

[54] DISPERSIBLE FILM

[75] Inventors: Richard W. Halle; Dirk J. Michiels, both of Houston, Tex.; Jeffrey A. Middlesworth, Wauconda, Ill.

[73] Assignee: Exxon Chemical Patents Inc., Wilmington, Del.

[21] Appl. No.: 261,550

[22] Filed: Jun. 17, 1994

Related U.S. Application Data

[62] Division of Ser. No. 128,927, Sep. 29, 1993, Pat. No. 5,415,905.

[51] Int. Cl.$^6$ .............................. C08L 23/08; C08L 23/16; B32B 27/32
[52] U.S. Cl. ...................... 428/35.7; 206/442; 206/83.5; 206/524.6; 206/524.3; 428/516; 525/221; 525/222; 525/240
[58] Field of Search .................................. 428/35.7, 516; 525/221, 222, 240; 206/442, 83.5, 524.6, 524.3

[56] References Cited

FOREIGN PATENT DOCUMENTS

95/07314  3/1995  WIPO .

*Primary Examiner*—Charles R. Nold
*Attorney, Agent, or Firm*—Douglas W. Miller

[57] ABSTRACT

Bales of unvulcanized rubber, or compounding ingredients for unvulcanized rubber are packaged in film or bags made from an ethylene α-olefin copolymer having a Vicat softening point below 90° C. and a melting point below 100° C., and optionally a second ethylene copolymer is added to improve processability of the first ethylene copolymer. The second ethylene copolymer will contain more long-chain branches than the first ethylene copolymer. Such films may be included in a rubber compounding operation.

3 Claims, No Drawings

DISPERSIBLE FILM

The present application is a Rule 60 divisional application of U.S. Ser. No. 08/128,927, filed Sep. 29, 1993, U.S. Pat. No. 5,415,905.

FIELD OF THE INVENTION

This invention relates to a polymer film used for wrapping bales, of either natural or synthetic rubber (elastomer), and for making bags used in compounding elastomers or plastics. In another aspect, the invention relates to elastomer bales covered with the film, and to bags containing compounding ingredients, wherein the film disperses into a melted or plasticized polymer mixture.

BACKGROUND

In the manufacture of elastomeric mechanical goods and in some polymerization processes, elastomers and/or numerous additives are combined in a plasticized, or blended mix prior to molding, curing or reaction/polymerization.

Synthetic Elastomer Bale Wrap

In the manufacture of synthetic rubber, such as butyl, chlorobutyl, EPDM, and EPR, raw rubber pieces (referred to as "crumbs") are passed from a reactor through a drying oven, and collected in a compression mold where they are compressed into bales generally in the range of 14"×28"×8". The bales are then placed in large containers ("bins") sized to receive 30–45 of the bales for storage and transport. At the location of use (a tire manufacturing plant for example), the bales are withdrawn from the bin and individually processed.

The bales are placed in the bin at elevated temperatures (120°–210° F., 48° C.–98° C.) which can cause bale to bale sticking if the bales are in direct contact with each other. The sticking and cold flow of the rubber makes it difficult to remove individual bales from the bin. It is generally not practical to permit the bales to cool to room temperature before placing them in the bins. Exposure to elevated temperatures during storage and transit would cause further sticking and cold flow.

This sticking led to the development of thermoplastic film bale wrap. Bale wrap film is applied, by conventional in-line equipment, to completely encapsulate or wrap the rubber bale after the drying and molding steps, prior to being placed in the bin. The film prevents rubber-to-rubber contact, and also resists the cold flow of the rubber.

The bales are boxed, sometimes in five layers on top of each other ready for shipment. The bales to be packaged sometimes are still warm from the manufacturing process and the bales may also be placed in the box in a compressed condition to save space. On arrival at the manufacturing location, the bales are removed from the box and the wrapped bales are then processed.

Compounding Bags

One of the applications for the film of the present invention is for use as compounding bags. In particular, this film is well suited to form remote weighing bags for materials such as sulfur, peroxide, primary and secondary accelerators, stearic acid, zinc oxide, plasticizers and oils, and other materials added to internal mixers (or blenders, compounding devices and reaction vessels) in small quantities. Such compounding bags also find use for carrying ingredients in many chemical operations such as mixing, blending, compounding, reaction blending and polymerization.

A remote weighing system using compounding bags can consist of a simple manual set-up where a worker preweighs batches of specific components, or it could be as elaborate as an automatic form, fill and seal operation. In either case, the result is preweighed, packaged components which can be introduced to the process. Such preweighing eliminates the need for in-line weighing of ingredients, increasing safety and minimizing health concerns.

Remote weighing with bags has many advantages over the "scoop and shovel" method of addition: i.e., (1) improved housekeeping; (2) improved industrial hygiene; (3)loss control; (4) accuracy and quality control; and (5) labor savings. These improvements result from the bags being sufficiently low in Vicat softening point and melting point to dissolve and disperse during the compounding step in a mechanical mixer.

Polyethylene has been used for both bale wrap and compounding bags because of its plasticity and antiblock properties, and because it can be obtained at a relatively low cost. Bale wrap films now available include those made from low density homopolymer polyethylene (LDPE), ethylene vinyl acetate (EVA) copolymers, blends of these two or blends of each, with other additives. Polyethylenes previously used for these films have been made from free radical polymerizations, or Ziegler-Natta catalyzed polymerizations. Although LDPE and EVA films were successful in preventing sticking and cold flow of the rubber bales they present other problems. The first of these problems in a stack of rubber bales, is the splitting of film due to insufficient film strength and poor environmental stress crack resistance which occurs due to stress put on the film by the cold flow of the rubber and the nature of the container where the bales are placed.

The second problem is a downstream processing problem. Many end use applications cannot tolerate the presence of LDPE and EVA in an unmelted, or partially unmelted, state in a rubber or plastic compound. Two solutions to this problem are known. The first solution is to make the bale wrap easily peelable, facilitating its removal prior to placing the elastomer into compounding mixers. See for example U.S. Pat. No. 4,848,564.

The second solution is to change the melting and softening point behavior of the bulk film. This second solution allows the bale wrap film and/or the compounding bag to be placed in a mechanical mixer still covering the bale or compound ingredients. As the mechanical mixer begins to mix, imparting energy to all components, the heat generated or heat imparted, substantially softens or plasticizes all solid ingredients to permit formation of a substantially homogeneous rubber or plastic compound. In order to function in this manner, the bale wrap or compounding bag must be melted, or at least softened, and then mixed during the mixing cycle. U.S. Pat. No. 5,145,747 approaches this solution by extruding or coextruding an EVA with up to 30% of a compatible wax to depress the Vicat softening point and probably the melting point of the bulk film. U.S. Pat. No. 5,145,747 also discloses that 82° C. is the Vicat softening point above which softening plasticization, melting and homogenization with the final rubber compound will not occur to a sufficient degree.

The polyethylene based film used for either packaging use, has to meet specified criteria to conform to rubber quality control requirements. The quality control requirements may include the Vicat softening point and speaking generally this should be low, for example below approximately 100° C., preferably below 90° C., more preferably not exceeding 82° C.

The present invention provides an extrudable film forming composition which has a Vicat softening point and melting point low enough to permit its inclusion in a rubber compound while improving the film strength and environmental stress crack resistance.

SUMMARY OF THE INVENTION

With the present invention, it has been found that the above-mentioned disadvantages associated with prior art solutions can be minimized or eliminated by the use of a film made from at least one low density polyethylene resin, where the resin has a Vicat softening point up to 100° C. and a density up to 0.915 g/cm$^3$. In addition, the film (in a plasticized or melted state) is compatible with rubber compounds. A film having a melt point temperature to achieve such compatibility will generally also allow shorter mixing times for the rubber being compounded, therefore providing for greater productivity. The film's low melting temperature (below 120° C.), substantially insures fluxing into the rubber compound mix.

One aspect of our invention, a polyethylene film, formed from an ethylene-olefin copolymer, is provided wherein such film has:

a) a density in the range of from about 0.85 to about 0.915 g/cm$^3$;

b) a melt index in the range of from about 0.1 to about 10 grams per 10 minutes;

c) a Vicat softening point not exceeding 100° C.; and d) a melting point not exceeding 120° C.

Such films provide sufficient sealability at sealing temperatures, as well as splitting and creep resistance, while packaging the rubber bale, and also provide a Vicat softening point and melting point low enough to enable the wrapped bale or compound ingredient bag to be placed in a mechanical mixer along with other ingredients, and then mixed into a substantially homogeneous rubber compound.

In a preferred embodiment, a second ethylene polymer is added to improve the melt processability of the first ethylene copolymer. The second ethylene polymer may be a polyethylene homopolymer or a copolymer of ethylene and an ethylenically unsaturated ester of a carboxylic acid. The second ethylene polymer is preferably any polymer with sufficient long chain branching to contribute to the melt processability of the first ethylene copolymer.

In a more preferred embodiment, the first ethylene copolymer is present in the range of from about 75 to about 99 percent by weight of the total blend weight. The second ethylene copolymer or ethylene homopolymer is present in the range of from about 25 to about 1 weight percent based on the total blend weight.

In the preferred embodiments, it is preferred that a film made from one or more of these ethylene polymers has a Vicat softening point not exceeding 90° C. and the melting point does not exceed 110° C. More preferably the Vicat softening point does not exceed 82° C. and the melting point does not exceed 100° C.

DESCRIPTION OF THE PREFERRED EMBODIMENTS

Our invention concerns certain films, their production and applications. These films have unique properties which make them particularly well suited for use in certain compounding or manufacturing operations. These films have combinations of properties rendering them superior to films previously available for many such compounding or manufacturing operations. Following is a detailed description of certain preferred film within the scope of our invention, preferred methods of producing these films and preferred applications of these films. Those skilled in the art will appreciate that numerous modifications to these preferred embodiments can be made without departing from the scope of the invention. For example, though the properties of the film are exemplified in elastomer compounding applications, they have numerous other uses. To the extent our description is specific, this is solely for the purpose of illustrating preferred embodiments of our invention and should not be taken as limiting our invention to these specific embodiments.

Various values given in the text and claims are determined as follows:

Melt index (MI): ASTM D 1238 Condition E 190° C., 2.16 kg mass; expressed in g/10 min Vicat softening point: ASTM-1525 with a 1000 g weight Melting point: Differential Scanning Calorimeter (DSC) second melting curve melting peak in degrees centigrade.

The film of the present invention for use as a rubber bale wrap or compounding bag, has the following properties: good seal strength, a low melting point, good sealability, a low Vicat softening point, resistance to splitting and resistance to stress cracking. The low Vicat softening point and the low melting point improves the ability of the film to be incorporated into a homogeneous mixture of rubber and rubber compounding ingredients to form homogeneous rubber compounds.

The film of the present invention for use as rubber bale wrap and compounding bags may be made from a single ethylene copolymer or a blend of such ethylene copolymer with other ethylene copolymers, or with ethylene homopolymers.

In an embodiment of the present invention, a film is made for either bale wrapping or for making compounding bags. In either case, the film must have softening and melting characteristics that permit its inclusion into the rubber compounding process, and such inclusion will result in a substantially homogeneous compounded elastomer blend.

The film may be made from an ethylene α-olefin copolymer (first ethylene polymer). This first ethylene polymer has a density in the range of from about 0.85 to about 0.915 g/cm$^3$, a Vicat softening point less than about 100° C. and a differential scanning calorimeter (DSC) second melting point (melting point) not exceeding about 120° C. The α-olefin utilized to make first ethylene polymer is selected from propylene, butene, pentene, hexene, octene and decene.

Preferably, the film made from the first ethylene polymer has a Vicat softening point in the range of from about 10° C. to about 90° C. and a melting point of from about 30° C. to about 110° C. More preferably, the film made from the first ethylene polymer has a Vicat softening point in the range of from about 25° C. to about 82° C. and a DSC melting point in the range of from about 50° C. to about 100° C.

The first ethylene polymer may be made by a number of processes, including high pressure, low pressure, gas phase, fluidized bed, slurry or solution processes. Where free radical polymerization is not used, the catalysts used for the polymerization are generally of the metallocene-alumoxane, metallocene-ionic activator, or Ziegler-Natta types, although metallocene-alumoxane catalysts are preferred. Such catalysts are well known. Thus, useful catalysts are those disclosed in EP 129368, U.S. Pat. Nos. 5,026,798 and 5,198,401.

Optionally, a second ethylene polymer may be blended into the first ethylene polymer. The second ethylene polymer is preferably not used for depressing either the Vicat softening point or the melting point of the first ethylene polymer, although such depression is not precluded. The main purpose of the second ethylene polymer is to improve melt processability (reduced neck-in and higher melt strength) of the blend over the processability of the first ethylene polymer alone. The second ethylene polymer is generally a molecule containing long chain branching. Long chain branching is defined herein as a chain length of at least 6 carbon atoms, above 6 carbon atoms the length cannot be determined using $^{13}$C nuclear magnetic resonance spectroscopy (NMR). The long chain branch can contain as many carbon atoms as the polymer back-bone. Long chain branching is determined using $^{13}$C NMR and is quantified using the method of Randall (*Rev. Macromol. Chem, Phys.*, C29 (2 and 3), pages 285–297) the disclosure of which is incorporated herein by reference. Whereas the first ethylene polymer contains less long chain branches. Generally, the fewer the long chain branches, the more difficult the resin is to melt process. Difficulty in processing can be manifested by bubble instability in blown film and draw resonance, surging and/or neck-in in cast films.

In another embodiment of the present invention, the second ethylene polymer is a polyethylene homopolymer or preferably an ethylene copolymer of ethylene and an ethylenically unsaturated carboxylic acid ester. Preferred ethylenically unsaturated acrylic acid esters include, for example, vinyl acetate, methyl acrylate, butyl acrylate, and ethyl acrylate. A most preferred ester monomer is vinyl acetate. These comonomers are present in the second ethylene polymer within a range of from about 1 to about 35 weight percent, preferably from about 1 to about 15 weight percent of the unsaturated acrylic acid ester, based on the total weight of the second ethylene polymer.

The second ethylene polymers are chosen, in general, primarily based on their ability to enhance processability of the first ethylene polymer and their melting points and/or Vicat softening points. That is, the melting points and/or Vicat softening points of such polymers should not have a substantial deleterious effect on these same parameters of the first ethylene polymer, and the film made therefrom at the level of inclusion in the blends, but will mitigate processing debits of the first ethylene polymer. In general, a 10% improvement in bubble stability or neck-in would be desirable.

When the second ethylene polymer is included in the manufacture of film, it is present in the range of from about 25 to about 1 weight percent based on the total weight of the blend. The first ethylene polymer is present in the range of from about 75 to about 99 weight percent, based on the total weight of the blend.

In the preferred embodiment, the first ethylene polymer is present in the range of from about 85 weight percent to about 95 weight percent based on the total weight of the blend. The second ethylene polymer is present in the range of from about 15 to about 5 weight percent based on the total weight of the blend.

It should be understood that the first ethylene polymer may be used for film manufacture without the use of the second ethylene polymer. However, in either the case where the first ethylene polymer is used alone, or in the case where it is blended with the second ethylene polymer, it is understood that the Vicat softening point of the resulting film does not exceed 100° C., and the melting point of the film does not exceed 120° C. Preferably, the film made from the blend has a Vicat softening point in the range of from about 10° C. to about 100° C., and a melting point of from about 30° C. to about 110° C. More preferably, the film has a Vicat softening point in the range of from about 25° C. to about 82° C., and a melting point in the range of from about 50° C. to about 100° C.

It should be further understood that additives often found in films are contemplated by our invention as well. Such additives will be understood by those skilled in the art to include those that will have an effect on surface characteristics of films, processability of resins being made into films, and thermal stability of resins or film. These, and other types of additives, are normally carried in polyolefins, but may be added without such polyolefin carriers. The additive types mentioned are not meant to be a complete list, but merely illustrative.

In the practice of this invention, the rubber is compounded utilizing a mechanical mixer. The compounded rubber can include mixed unvulcanized rubber with the bale wrap and/or a compounding ingredient bag film of this invention. The compounded rubber can also include accelerators, promoters, curing or crosslinking agents, fillers, colorants, anti-oxidants, and other adjuvants.

Both the rubbers and additives are well known. See for instance, U.S. Pat. Nos. 4,394,473; 5,145,747; and 4,848,564.

EXAMPLE 1

A film was made using a slip and anti-block master batch (AMPACET 50568), manufactured by Ampacet Corporation containing 5 weight percent slip and 20 weight percent anti-block, and the remaining 75 weight percent is a 0.3 MI ethylene vinyl acetate copolymer film grade polyethylene resin containing 6 weight percent vinyl acetate. The master batch was added to Exact™ 3027 (a 3.5 melt index, 0.900 density, ethylene butene copolymer polyethylene available from Exxon Chemical Company) at a 2 weight percent level based on the total weight of the blend. This resulted in a total slip and anti-block levels of 1,000 parts per million (ppm) and 4,000 ppm, respectively.

The film was prepared on a Black Clawson cast film extrusion line run in an embossed mode. The operating rate was 22.8 meters per minute of film. The resin showed a tendency to neck-in, in the range of 35 to 40 cm out of a total die length of 91 cm. While the neck-in was significant, a commercial film could be made. The film would have a Vicat softening point of 76° C. and a melting point of 92° C.

EXAMPLE 2

A second run was accomplished as disclosed in Example 1. The second run was made using 88 weight percent EXACT™ 3027 low density polyethylene from Exxon Chemical Company, 2 weight percent Ampacet 50568 and 10 weight percent of a 0.31 MI, 6 weight percent vinyl acetate EVA copolymer Escorene LD-317.09 (available from Exxon Chemical Company). The neck-in for this blend was 5–10 cm. Three different film thicknesses were produced nominal 50 microns, 44 microns, and 38 microns. The Vicat softening point of the film was 80° C., the melting point was 91° C.

Table 1 shows the physical properties of the three films thicknesses produced in Example 2.

Table II shows various resins that either were made into films or might have been candidates for film making, based solely on the Vicat softening point. However, as experience was gained, the resin's extrudability, its melting point and the splitting or stress crack resistance of a film became of critical concern. Within these parameters, only a few of the films produced met all the requirements, specifically the film of Example 1 and the film of Example 2, EMB-551. The EMB-540 film was marginal due to elevated melting point. Several resins are identified in Table II that were not made into film. However, films made from these polymers would be expected to have similar, if not equal properties to the bulk resin, such as Vicat softening point and melting point. The results shown on this table would indicate that based in Vicat softening point alone, all of the polymers or films made therefrom would be of interest for bale wrap or compound ingredient bags. However, experience has shown that the Attane™ product (XU61512.13, Dow Chemical Company) would be only marginally acceptable in film form (without any additives to lower the melting point), due to the relatively high melting point. Even as mentioned above, the EMB-540 has marginal performance again, due to a higher than desirable melting point.

TABLE I

XEMB-551 FILM
(Example 2)
PHYSICAL PROPERTIES

| TARGET GAUGE (microns) | 38 | 44 | 50 |
|---|---|---|---|
| ACTUAL GAUGE (microns) | 37 | 45 | 51 |
| COF | 0.090 | 0.115 | 0.130 |
| MD ULTIMATE TENSILE (grams) | 3287 | 4006 | 4445 |
| TD ULTIMATE TENSILE (grams) | 2768 | 3022 | 4072 |
| MD ELONGATION (%) | 541 | 567 | 558 |
| TD ELONGATION (%) | 623 | 592 | 651 |
| MD TENSILE at 10% (grams) | 375 | 461 | 472 |
| TD TENSILE at 10% (grams) | 321 | 416 | 472 |

TABLE III

SPLITTING PERFORMANCE
Film of Example 2 used to Wrap Butyl Rubber Bales:

| Film Thickness (microns) | 38 | | 44 | | 50 | |
|---|---|---|---|---|---|---|
| Days Aging | 8 | 12 | 8 | 12 | 8 | 12 |
| Bale Packout Temperature | | | | | | |
| 62.5° C. | no | — | | | | |
| 68° C. | no | — | no | no | — | — |
| 64.5° C. | — | — | — | — | no | — |
| 70.5° C. | — | — | — | — | — | no |

— not tested

All bales shown in Table III were loaded at the temperatures shown at a commercial facility at commercial conditions. Nearly 40% of all bags at all temperatures had no tears. The remaining 60% had minor tears attributable to impact or abrasion, but none due to cold flow splitting.

As shown in Table II, films were made from a 0.3 MI, 6% VA (EMB-540) had occasional splitting and stress cracks after storage. However, due to a slightly high Vicat and melting point, an improvement was sought. An EVA with a higher MI and a higher VA content would have lower Vicat softening point and lower the melting point properties.

The XEMB-547 and the EMB-547-E were made from resins with 2MI, 9% VA and 2.5 MI and 8.5% VA respectively, but both exhibited unacceptable splits and stress cracking. Another attempt to achieve the correct balance of properties was EMB-549 (0.4 MI, 13.3% VA). This film provided the proper Vicat and melting point, but again showed poor split and stress crack resistance and poor extrudability. The film of the present invention showed the best combination of properties.

Table III contains further data on whether splits or stress cracking in the film were observed during storage under conditions (number of days and temperature) such shown in Table III for 3 different film thicknesses of the film of Example 2.

TABLE II

| Resin | Film Designation | Softening Point Vicat °C. | Melting Point °C. | Split/Stress Crack | Extrudable |
|---|---|---|---|---|---|
| *LD-326.05 (0.3 MI, 6% VA) | EMB-540 | 83 | 104 | OCCASIONAL | YES |
| *LD-318.92 (2 MI, 9% VA) | XEMB-547 | 80 | 99 | YES | YES |
| *EXACT 3002 4.0 MI (0.9034 density) | (NONE) | 81 | 94 | NOT TESTED | NOT RUN |
| EXACT 3027* (3.5 MI, 0.900 density) | EXAMPLE 1 | 76 | 92 | NOT TESTED | YES |
| +ATTANE XU 61512.13 3.96 MI (0.9037 density) | (NONE) | 76 | 124 | NOT TESTED | NOT RUN |
| Example 2 (88% Exact 3027, 10% LD317.09, 2% Ampacet 50568) | XEMB-551 | 80.3 | 90.95 | NO | YES |
| ·UL208ME[1] (2.51 MI, 8.5% VA) | EMB-547 E | 77 | — | YES | YES |
| *LD-705.16 (0.4 MI, 13.3% VA) | EMB-549 | 77 | 92 | YES | NO[2] |

*Available from Exxon Chemical Company.
+A product of the Dow Chemical Company.
·Available from Exxon Chemical Belgium.
[1]Not available in the United States.
[2]Could not be drawn down below 3 mile in cast equipment.

Table III shows the film as produced in Example 2, in three thicknesses, where the film was used to package bales of butyl rubber, stored for from 8 to 12 days. Bale temperatures at loading, ranging from about 62.5° C. to 70.5° C., were noted as the loading temperature will have an effect on the creep and cold flow of the rubber, the creep and cold flow are contributing elements to splitting and stress cracking.

We claim:

1. A package comprising:
   a) an article selected from the group consisting of an unvulcanized rubber, a vulcanized rubber, compounding ingredients, and combinations thereof wherein said article is covered with and in contact with a film;
   b) said film made from a polymer blend, said polymer blend having:
      i) a first ethylene copolymer present in the range of from about 75 to about 99 percent by weight, said percentage based on the total polymer blend weight, said first ethylene copolymer being an ethylene-α-olefin copolymer, wherein said first ethylene copolymer has a density in the range of from about 0.85 to about 0.915 g/cm$^3$, said first ethylene copolymer having a Vicat softening point less than about 100° C., said first ethylene copolymer having a melting point not exceeding about 120° C., said alpha-olefin being selected from the group consisting of propylene, butene, pentene, hexene, octene, and, decene; and
      ii) a second ethylene copolymer, containing long chain branching, present in the range of from about 1 to about 25 percent by weight based on the total weight of the polymer blend, said ethylene copolymer having in the range of from about 65 to about 99 percent by weight of ethylene and in the range of from about 1 to about 35 percent by weight of an ethylenically unsaturated acrylic acid ester based on the total weight of the second ethylene copolymer, wherein said polymer blend has a Vicat softening point in the range of from about 10° C. to about 90° C. and a melting point in the range of from about 30° C. to about 110° C.

2. The package as recited in claim 1, wherein said ethylenically unsaturated acrylic acid ester is selected from the group consisting of methyl acrylate, butyl acrylate, and ethyl acrylate.

3. A package comprising:
   a) an article selected from the group consisting of an unvulcanized rubber, a vulcanized rubber, compounding ingredients, and combinations thereof wherein said article is covered with and in contact with a film; and
   b) said film made from a polymer blend, said polymer blend having:
      i) a first ethylene copolymer present in the range of from about 75 to about 99 percent by weight, said percentage based on the total polymer blend weight, said first ethylene copolymer being an ethylene-α-olefin copolymer, wherein said first ethylene copolymer has a density in the range of from about 0.85 to about 0.915 g/cm$^3$, said first ethylene copolymer having a Vicat softening point less than about 100° C., said first ethylene copolymer having a melting point not exceeding about 120° C., said alpha-olefin being selected from the group consisting of propylene, butene, pentene, hexene, octene, and, decene; and
      ii) a second ethylene copolymer, containing long chain branching, present in the range of from about 1 to about 25 percent by weight based on the total weight of the polymer blend, said ethylene copolymer having in the range of from about 65 to about 99 percent by weight of ethylene and in the range of from about 1 to about 35 percent by weight of vinyl acetate based on the total weight of the second ethylene copolymer, wherein said polymer blend has a Vicat softening point in the range of from about 10° C. to about 90° C. and a melting point in the range of from about 30° C. to about 110° C.

* * * * *